Patented Nov. 19, 1935

2,021,527

UNITED STATES PATENT OFFICE 2,021,527

PROCESS OF PRODUCING DICALCIUM PHOSPHATE AND FERTILIZERS CONTAINING SAME

Robert Suchy and Emil Reubke, Bitterfeld, Germany, assignors to I. G. Farbenindustrie Aktiengesellschaft, Frankfort-on-the-Main, Germany No Drawing. Application August 20, 1932, Serial No. 629,744. In Germany August 31, 1931

2 Claims. (Cl. 23—109)

This invention relates to the production of phosphate compounds having fertilizing properties and more particularly to a process for the production of dicalcium phosphate.

At the present time, dicalcium phosphate is generally produced by decomposing phosphates with an excess of acids and neutralizing the resulting solutions—after filtration if necessary—with milk of lime to such an extent that the liberated phosphoric acid is precipitated, as dicalcium phosphate, from the solution. For this purpose 6 equivalents of acid for the decomposition, and 1 molecule of lime for the neutralization, are required per molecule of tricalcium phosphate. The neutralization must be carefully carried to completion because dicalcium phosphate is readily soluble, even in dilute acids, and when the neutralization is incomplete only a portion of the phosphoric acid employed will be recovered, whilst the remainder is lost in the filtrate.

In order to lessen the consumption of acid, it has already been proposed to replace milk of lime, for the neutralization, by phosphatic substances, such as bone meal (de-gelatinized and ground extremely fine), basic slag or readily decomposable calciferous phosphates, all of which have the property of reacting with the phosphoric acid solution in the cold, until complete neutralization is attained, since otherwise the precipitation, as dicalcium phosphate, of the phosphoric acid in the solution would, at ordinary temperatures, take place to only a moderate extent, if at all. The application of heat for the purpose of completing the neutralization of the still slightly acid solutions must be avoided, for, as is known, partial transformation of dicalcium phosphate to tricalcium phosphate occurs in solutions that are quite, or nearly, neutral.

It therefore appeared impracticable to utilize the mineral phosphates of lime, such as Pebble phosphate or Morocco phosphate, for the neutralization of solutions of phosphoric acid, with recovery of dicalcium phosphate, the said substances being too sparingly soluble in the acid solutions from the decomposition treatment. The reaction between the mineral phosphates and the acid solution ceases at a point when the solution is still so acid that the precipitation of the phosphoric acid as dicalcium phosphate occurs either not at all or to a very incomplete extent, whilst, in addition, the dicalcium phosphate is contaminated with still undissolved raw phosphates.

In consequence, the art has hitherto generally been satisfied with the conversion of mineral calcium phosphates into mono-calciumphosphate by means of a treatment with phosphoric acid. It has also been suggested to free crude phosphoric acid, obtained by decomposition from phosphates with sulphuric acid, from the contaminating aluminium and iron phosphates, and also from arsenic compounds, by a treatment with, inter alia, native phosphates at elevated temperatures in such proportion as to leave about 28 to 30 percent of the phosphoric acid which is uncombined with alumina and iron in the free state, and then after heating and separating the precipitated matter, while still hot, to convert the filtrate into a solid product high in soluble phosphoric acid by evaporation.

It is the main object of the present invention to provide a process by means of which mineral tricalcium phosphate is quantitatively converted into dicalcium phosphate according to the net equation

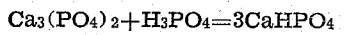
$$Ca_3(PO_4)_2 + H_3PO_4 = 3CaHPO_4$$

this resulting in a considerable saving in the proportion of phosphoric acid required, as compared with the previously known processes.

It is known, that solutions of mono-calciumphosphate obtained by decomposition of mineral phosphates which contain but an insignificant proportion of free phosphoric acid, or even none, upon being heated undergo a hydrolytic dissociation which leads to the separation of solid dicalcium phosphate from the solution. It has now been ascertained in accordance with the present invention, that this separation also takes place in solutions containing phosphoric acid in such proportions that the ratio of $P_2O_5$ to $CaO$ is substantially in excess over that prevailing in the mono-calcium phosphate. After the separation of the dicalcium phosphate—for example by filtration, centrifuging or decantation, and of course without substantially cooling the solution—there is obtained a solution containing mono-calcium phosphate and free phosphoric acid which is saturated with respect to dicalcium phosphate at the elevated working temperatures, but unsaturated in the cold. This strongly acid solution obtained according to the invention is, without further concentration, sufficiently strong to be employed for decomposing further quantities of raw phosphate with phosphoric acid added in accordance with the foregoing equation. When operating in this manner, it is possible to maintain the concentration of the circulating decomposing solution for an indefinite number of cycles, so that all the phosphoric acid introduced into the different batches as such and in the form of tricalcium phosphate is continuously recovered as dicalcium phosphate.

The proportion of free phosphoric acid to be contained in the solution which is subjected to hydrolysis, is limited by the consideration that the filtrate resulting from hydrolysis, after addition of only that amount of fresh phosphoric acid which corresponds to the quantity of phosphoric acid separated by hydrolysis in the form of dicalcium phosphate, must be of sufficient strength to effect complete decomposition of a fresh batch, of the same quantity, of mineral calcium phosphate. The phosphoric acid concentration, thus defined in relation to the lime present in the solution before its being subjected to hydrolysis constitutes the lower limit for what is termed, in the present specification and in the appended claims "a substantial excess over the ratio prevailing in mono-calcium phosphate". According to practical experience it is necessary for the purposes of the present invention, that the solution to be subjected to hydrolysis contain at least about 1.30 mols $P_2O_5$ for every mol of CaO. On the other hand, of course, there is an upper limit set for this proportion by the necessity of avoiding precipitation of mono-calcium phosphate together with the dicalcium phosphate owing to the limited solubility of the former compound in concentrated phosphoric acid. Preferably the phosphoric acid concentration in the filtrate obtained after hydrolysis—which is to be employed in the decomposition of the next batch of raw phosphate—should range somewhere between about 280 and 420 g. $P_2O_5$ per liter.

In this manner, raw tricalcium phosphate can be transformed into dicalcium phosphate with half the amount of acid otherwise required—that is to say, with 3 equivalents of acid per molecule of tricalcium phosphate—and whilst utilizing its own lime content, thereby saving the lime otherwise needed for the neutralization.

The herein described process is carried out preferably on the following lines:

In an acid-proof vessel—for example of a corrosion-resistant chromium nickel steel (so-called V2A steel)—fitted with stirrers and a heating apparatus, the finely ground raw phosphate is introduced into a solution (temperature 50–60° C.) consisting of 5.5 perc. of CaO, 32.5 percent of $P_2O_5$ and 62 percent of $H_2O$, and, in accordance with the equations:

$$Ca_3(PO_4)_2 + H_3PO_4 = 3CaHPO_4$$
$$CaO + H_3PO_4 = CaHPO_4 + H_2O$$

Sufficient concentrated phosphoric acid is added to transform the tricalcium phosphate, and also the free lime in the raw phosphate, into dicalcium phosphate.

After stirring for several hours, the phosphate will have dissolved, the time required depending on the fineness to which the raw phosphate has been ground, and also on the readiness with which it lends itself to decomposition. The solution is then heated to boiling point (about 103° C.) whereupon anhydrous dicalcium phosphate separates out in crystalline form, and is separated from the solution by filtration at the said temperature. The resulting product contains, apart from dicalcium phosphate, only the insoluble constituents (gangue and gypsum) that were present in the phosphate. In the case of a 75 percent Morocco phosphate, the product is of the following approximate composition:

| | Percent |
|---|---|
| Loss on incineration | 9.7 |
| $SiO_2$ | 1.6 |
| $Al_2O_3$ | 0.2 |
| $Fe_2O_3$ | 0.5 |
| CaO | 38.9 |
| $P_2O_5$ | 47.3 |
| $SO_3$ | 2.1 |

Of the phosphoric acid, 46.3 percent, that is to say, 97.8 percent of the total phosphoric acid, is citric acid soluble. In addition to dicalcium phosphate, the product contains 4.5 percent of gypsum and only about 2 percent of undecomposed tricalcium phosphate.

The reaction liquid loses a small quantity of water during the stirring and filtration, but this is easily replaced by the addition of washing water and by the water introduced with the phosphoric acid required for the transformation.

By means of the hereindescribed process, fertilizers that are almost free from ballast and contain 45 to 50 percent of $P_2O_5$ in a citric acid-soluble form, are obtainable from commercial raw phosphates. Fertilizers of lower concentration can also be produced in the same manner by employing a mixture of sulphuric acid and phosphoric acid for the decomposition, a measure which renders the process more economical. In such case, mixtures of gypsum and dicalcium phosphate are obtained which can be adjusted to any desired concentration of phosphoric acid by suitably modifying the relative proportions of the decomposing acids. For example, by employing a mixture of 207 kgs. of sulphuric acid (sp. gr. 1.836) and 188 kgs. of phosphoric acid (sp. gr. 1.490), to act upon a 75 percent Morocco phosphate, a product with the composition:

| | Percent |
|---|---|
| Loss on incineration | 9.8 |
| $SiO_2$ | 1.3 |
| CaO | 38.8 |
| $SO_3$ | 16.2 |
| $P_2O_5$ | 34.8 | is obtained.

Of the phosphoric acid, 34.7 percent (99.7 perc. of the total phosphoric acid) is citric acid-soluble. The mixture contains 66.5 percent of dicalcium phosphate.

It is also possible to substitute sulphuric acid for the whole of the phosphoric acid employed for decomposition, and thereby to exclude the production of phosphoric acid as a separate stage of the process by forming the amount of phosphoric acid needed for the decomposition by adding a corresponding amount of sulphuric acid to the filtrate from the dicalcium phosphate. The resulting gypsum is separated by filtration, and the filtrate is employed for treating raw phosphate as already described. In this manner, by the exclusive employment of sulphuric acid, fertilizers are obtained which are entirely free from ballast.

Examples (1) 1200 litres of a solution containing 410 grms. of $P_2O_5$ and 75.2 grms. of CaO per litre are placed in a vessel of $V_2A$ steel which is fitted with stirrers and heating apparatus. 100 kgs. of ground Morocco phosphate of the composition:

|  | Percent |
|---|---|
| Loss on incineration | 6.8 |
| $SiO_2$ | 1.7 |
| $Al_2O_3$ | 0.6 |
| $Fe_2O_3$ | 0.4 |
| CaO | 51.5 |
| $P_2O_5$ | 34.3 |
| $SO_3$ | 1.4 | are introduced, together with 41.8 litres of phosphoric acid (sp. gr. 1.490) into this solution at a temperature of 60° C. After stirring for 5 hours, the temperature is raised to the boiling point of the solution, which is then filtered. After washing and drying, 130 kgs. of dicalcium phosphate of the composition:

|  | Percent |
|---|---|
| Loss on incineration | 8.0 |
| $SiO_2$ | 0.8 |
| CaO | 39.9 |
| $P_2O_5$ | 49.1 |
| $SO_3$ | 1.3 | are obtained. Of the phosphoric acid, 48.2 percent (98 percent of the total phosphoric acid) is citric acid-soluble. The mother liquor is made up to 1200 litres again with part of the washing water. It then contains 405 grms. of $P_2O_5$ and 69.8 grms. of CaO per litre, and can be immediately employed for another decomposition. The remainder of the washing water is used for washing the next batch.

(2) The same decomposition is performed in the same vessel, except that 24.9 kgs. of phosphoric acid (sp. gr. 1.490) and 27.4 kgs. of sulphuric acid (sp. gr. 1.836) are employed per 100 kgs. of the specified phosphate. After heating to the boiling point of the solution (105° C.) and filtering, 132 kgs. of a fertilizer are obtained, consisting, to the extent of two-thirds, of dicalcium phosphate and having the composition:

|  | Percent |
|---|---|
| Loss on incineration | 11.2 |
| $SiO_2$ | 1.2 |
| CaO | 37.8 |
| $P_2O_5$ | 33.8 |
| $SO_3$ | 15.6 |

Of the phosphoric acid, 33.0 percent (97.7 percent of the total phosphoric acid) is citric acid-soluble.

(3) 61 kgs. of concentrated sulphuric acid (sp. gr. 1.836) are introduced into the solution specified in Example 1, and the precipitated gypsum is removed by filtration. The filtrate is employed to treat 131 kgs. of Morocco phosphate in the manner described above. After heating and filtering the solution, 85.2 kgs. of dicalcium phosphate are obtained, of the following composition:

|  | Percent |
|---|---|
| Loss on incineration | 8.1 |
| $SiO_2$ | 2.5 |
| CaO | 39.5 |
| $P_2O_5$ | 47.1 |
| $SO_3$ | 2.4 |

Of the phosphoric acid, 45.9 percent (97.3 percent of the total phosphoric acid) is citric acid-soluble.

We claim:—

1. A process of producing dicalcium phosphate which comprises dissolving raw tricalcium phosphate by treatment with a solution containing mono-calcium phosphate and free phosphoric acid in such proportions that the resulting solution still contains a substantial excess of phosphoric acid over the ratio prevailing in mono-calcium phosphate, heating the resulting solution to boiling temperatures thereby precipitating dicalcium phosphate, separating the precipitate from the solution without substantially cooling the same, adding to such solution the amount of phosphoric acid required for converting a fresh batch of raw phosphate into dicalcium phosphate according to the net equation $$Ca_3(PO_4)_2 + H_3PO_4 = 3CaHPO_4$$

and dissolving such fresh batch in the solution obtained.

2. A process for producing dicalcium phosphate which comprises dissolving raw tricalcium phosphate by treatment with a solution containing mono-calcium phosphate, phosphoric acid and sulphuric acid in such proportions that the resulting solution still contains a substantial excess of phosphoric acid over the ratio prevailing in mono-calcium phosphate, heating the resulting solution to boiling temperatures thereby precipitating dicalcium phosphate, separating the precipitate from the solution without substantially cooling the same, adding to such solution sulphuric acid so as to precipitate gypsum and liberate phosphoric acid, and dissolving a fresh batch of raw phosphate in the solution thus obtained.

ROBERT SUCHY.
EMIL REUBKE.